June 2, 1970     C. W. WEBER ET AL     3,515,305

GAS VENT

Filed Aug. 23, 1968

INVENTORS
CARL W. WEBER.
BY    RAYMOND McCARTHY.

ATTORNEY

United States Patent Office 3,515,305
Patented June 2, 1970

3,515,305
GAS VENT
Carl W. Weber, Grove St., Moravia, N.Y. 13118, and
Raymond McCarthy, 410 Churchill Lane, Fayetteville,
N.Y. 13066
Filed Aug. 23, 1968, Ser. No. 754,839
Int. Cl. B65d *51/16*
U.S. Cl. 220—44                                   4 Claims

ABSTRACT OF THE DISCLOSURE

Gas vent comprising a hollow casing having a threaded opening to receive the standard pipe thread of a vent pipe, and a downwardly directed rectangular vent opening, having two opposed inside walls having surfaces inclined upwardly away from each other, and a resilient wire mesh screen having a central rectangular section corresponding substantially to the internal cross section of the vent opening at the lower end of the two opposed inclined surfaces and having integral end sections formed at an angle to the central section and of an area approximately corresponding to said inclined surfaces, and resiliently and frictionally seated against said inclined surfaces.

---

This invention relates to vents and more particularly vents for gas distribution, and for use in connection with pressure regulators.

In gas distribution systems, employing pressure regulators for example, an outdoor vent to atmosphere is necessary as a protection against regulator failure as for example a defective diaphragm. The vent should be tamperproof, affording free flow at low pressure, and so constructed as to prevent the entrance of foreign matter as by use of screening. On the other hand the vent should be capable of clearing itself by low pressure differential should the vent be plugged up.

The present invention is directed to a vent fitting wherein the outlet is directed downwardly, and is provided with a screen wire closure that is readily inserted, difficult to manually remove from the outside, and readily removable by light differential pressure should the screen wire become contaminated and plugged up.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
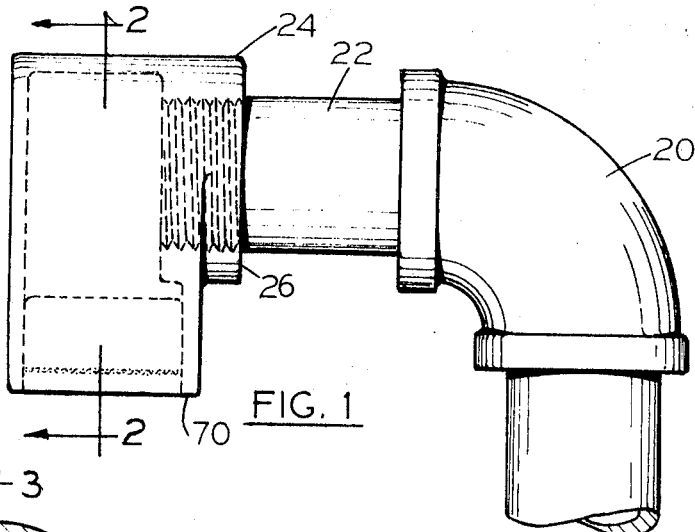
FIG. 1 is a side elevation of a vent coupled to standard piping leading to the vent of a pressure regulator.

Referring to the drawings, in FIG. 1 there is shown standard threaded piping leading from the vent aperture of a pressure regulator or the like, not shown. The pipe is provided with an elbow 20 and a short nipple 22, the latter being threaded into the vent fitting 24 as indicated. A street elbow can be employed in place of the elbow and nipple if desired. The vent fitting 24 comprises a hollow casting having a threaded boss 26, with pipe threads 28 to receive the nipple 22. The fitting provides a substantially rectangular chamber 30, open at the bottom as indicated at 32. The chamber has plain forward and rearward walls 34 and 36, the latter being integral with the boss 26. The opposite side walls 40 and 42 are provided with divergent planar surfaces 44 and 46 extending to shoulders 48 and 50, with an outlet mouth 52, provided with inclined inner faces 54 and 56 on the substantially rectangular lip 58.

Figure 2:
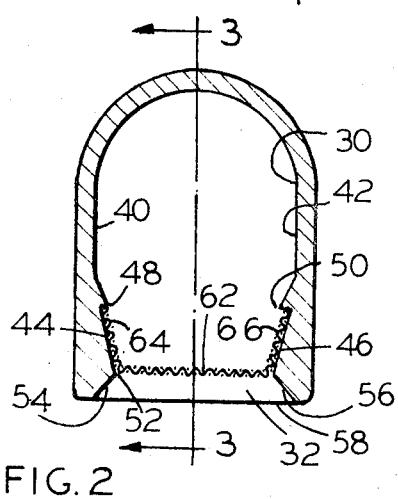
FIG. 2 is a sectional view taken on the line 2—2 of FIG. 1.
Figure 3:
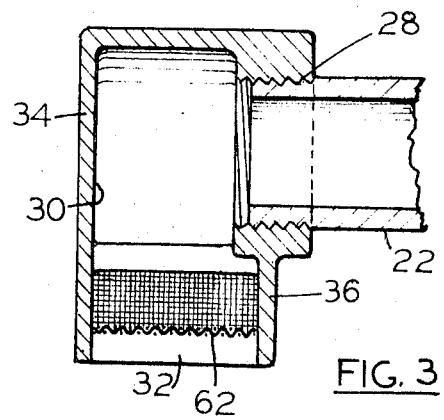
FIG. 3 is a sectional view taken on the line 3—3 of FIG. 2.
Figure 4:
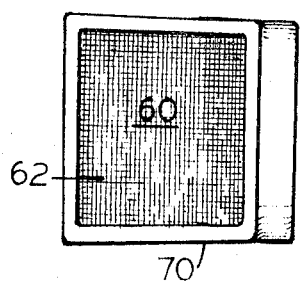
FIG. 4 is a bottom view of the vent.

Seated upon the surfaces 44 and 46 are the inwardly bent ends of a rectangular section of springy close mesh screen wire 60, the wire having a central substantially planar area 62, and diverging end portions 64 and 66 which are adapted to be sprung so as to lie in parallel planes at right angles to the planar area for insertion into position through the mouth, as indicated, particularly in FIG. 2. The outer ends of the portion 64 and 66 may resiliently bear against the diverging planar surfaces 44 and 46 to provide a relatively tight fit with their edges against the shoulders 48 and 50, and to avoid any looseness, and it will be seen that removal of the screen is opposed by such resiliency and the frictional contact between the portion 64 and 66 and the surfaces 44 and 46. The mesh of the screen wire, and size of the screen wire, and the substantially rectangular area of the mouth 52 is preferably such that the total area of the interstices between the crossed wires of the screen wire exceed the cross sectional area of the internal diameter of standard pipe for which the fitting is designed. In practice, bronze, or stainless steel screening may be employed, and the screening is readily pressed into position by deflecting the end sections inwardly so as to enable the ends to pass the reduced cross section at the mouth 52, and thereafter resiliently expand into position as shown in FIG. 2. In practice a mesh having about 16 wires to the inch is satisfactory to prevent insects and foreign matter from entering the fitting through the screen wire, and is adapted for use in a fitting of the size indicated as for standard ¾ inch pipe, which has an outside diameter slightly greater than one inch.

It will be seen that the fitting, when installed as indicated in FIG. 1, presents a peripheral substantially rectangular drip skirt or collar 70, and a screen that is relatively hidden from view. The screen is effective to prevent the curious from inserting fingers and the like into the opening, and is difficult to remove from the outside. If removal should be necessary, the fitting must first be removed from the nipple, and the screen pushed out by a tool or by inserting a finger through the threaded aperture of the boss. It will also be appreciated that should the screening become contaminated so as to block the flow, any pressure as little as a pound per square inch, or less would be sufficient to blow the screen out, and overcome the friction of the end sections 64 and 66 against the inclined side surfaces 44 and 46. The degree of friction, tending to hold the screen in place can be varied by increasing or decreasing the resilient pressure of the end portions 64 and 66 against the inclined surfaces, and by varying the size and angle of the inclined surfaces 44 and 46, so that any desired blow-out resistance can be had, within a range that would be desirable.

While a single embodiment with variations of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invenion.

What is claimed is:

1. A gas vent comprising a hollow casing having a threaded opening to receive the standard pipe thread of a vent pipe, and a downwardly directed vent opening, said vent opening being substantially rectangular in section and having two opposed inside walls having surfaces inclined upwardly away from each other, and a resilient wire mesh screen having a central rectangular section corresponding substantially to the internal cross section of the vent opening at the lower end of the two opposed inclined surfaces, said screen having integral end sections formed at an angle to the central section and of an area approximately corresponding to said inclined surfaces, and resiliently and frictionally seated against said inclined surfaces.

2. A gas vent as set forth in claim 1 wherein the central mesh area is such that the area sum total of the intersticial openings is not less than the internal cross section of a standard pipe for which the threaded opening is adapted.

3. A gas vent as in claim 1 wherein the central area of said screen wire is disposed upwardly and inwardly of the lower periphery of the vent opening to provide a drip skirt below the screen.

4. A gas vent as in claim 1 wherein the central mesh area is such that the area sum total of the intersticial openings is not less than the internal cross section of a standard pipe for which the threaded opening is adapted, and in which the central area of the screen wire is disposed upwardly and inwardly of the lower periphery of the vent opening to provide a drip skit below the screen.

References Cited
UNITED STATES PATENTS 1,784,067 12/1930 Holtson.
1,831,718 11/1931 Myers.
2,150,609 3/1939 Overcash _____ 222—189

LAVERNE D. GEIGER, Primary Examiner

R. J. SHER, Assistant Examiner

U.S. Cl. X.R.

137—550; 138—109; 210—460; 55—385, 507, 508, 509 511